Aug. 11, 1953  A. J. KROLL ET AL  2,648,758
CIGAR LIGHTER WITH LUMINOUS INDICATOR
Filed Nov. 15, 1949  2 Sheets-Sheet 1

INVENTORS
ALFRED J. KROLL
ARTHUR W. SCHNICK
BY
ATTORNEY

Aug. 11, 1953   A. J. KROLL ET AL   2,648,758
CIGAR LIGHTER WITH LUMINOUS INDICATOR
Filed Nov. 15, 1949   2 Sheets-Sheet 2
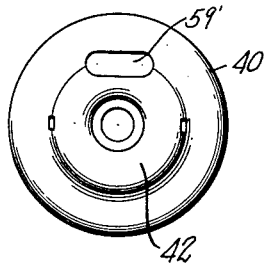
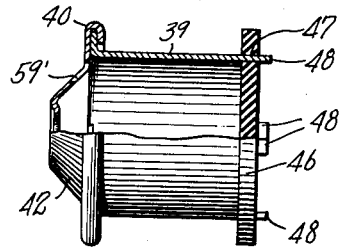
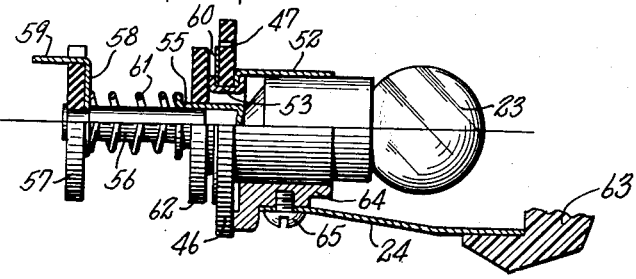
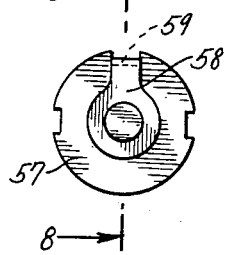
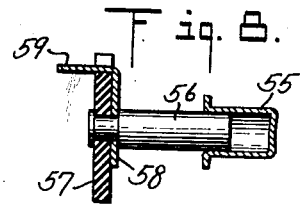
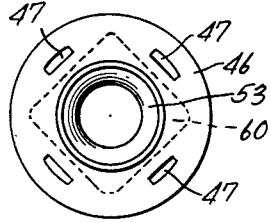
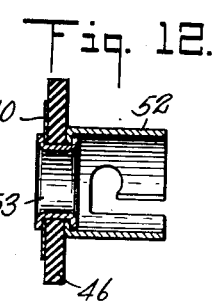
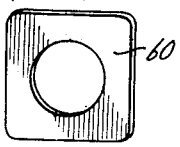
INVENTORS
ALFRED J. KROLL
BY ARTHUR W. SCHNICK
ATTORNEY Patented Aug. 11, 1953

2,648,758

UNITED STATES PATENT OFFICE 2,648,758

CIGAR LIGHTER WITH LUMINOUS INDICATOR

Alfred J. Kroll, Forestville, and Arthur W. Schnick, Meriden, Conn., assignors to The Cuno Engineering Corporation, Meriden, Conn., a corporation of Connecticut Application November 15, 1949, Serial No. 127,426

7 Claims. (Cl. 219—32)

1

This invention relates particularly to lighters such as are commonly installed in the instrument boards of motor vehicles. Such a device consists of a socket mounted in the instrument board and a removable plug which is normally mounted in the socket in an open circuit position. This plug carries an igniter element and the circuit is closed by movement of the plug with respect to the socket. When ready to use the plug is withdrawn. The return of the plug to the socket requires close attention of the user and at night it is sometimes difficult to locate the socket. In any event the return of the plug to the socket distracts the attention of the user. In case the driver is using the lighter this distraction introduces a serious hazard.

Therefore in order to facilitate the location of the socket a luminescent indicator is located adjacent the entrance to the socket and the plug is provided with an electric light which is lit when the plug is inserted for the purpose of ignition. This light activates the luminescent indicator which remains sufficiently brilliant when the plug is removed to definitely attract the attention of the user to the entrance of the socket so that the plug may be accurately inserted without more than momentarily distracting the attention of the user. Such light-activated luminescent substances are known in the art as photoluminescent.

Fig. 4 is an end view of the sleeve of the plug.

Fig. 5 is a side view and longitudinal section of the sleeve of Fig. 4.

Fig. 6 is a longitudinal section and side elevation showing the lamp socket assembly.

Fig. 7 is an end view of a part of the lamp socket assembly.

Fig. 8 is a side view and section of the same.

Figs. 9 and 10 are detail end and side views of the connecting eyelet of the lamp socket assembly.

Figs. 11 and 12 are end views and longitudinal sections, respectively, of the lamp socket and its immediate support.

Fig. 13 is a detail view of the contact member and the lamp socket assembly.

Figure 1:
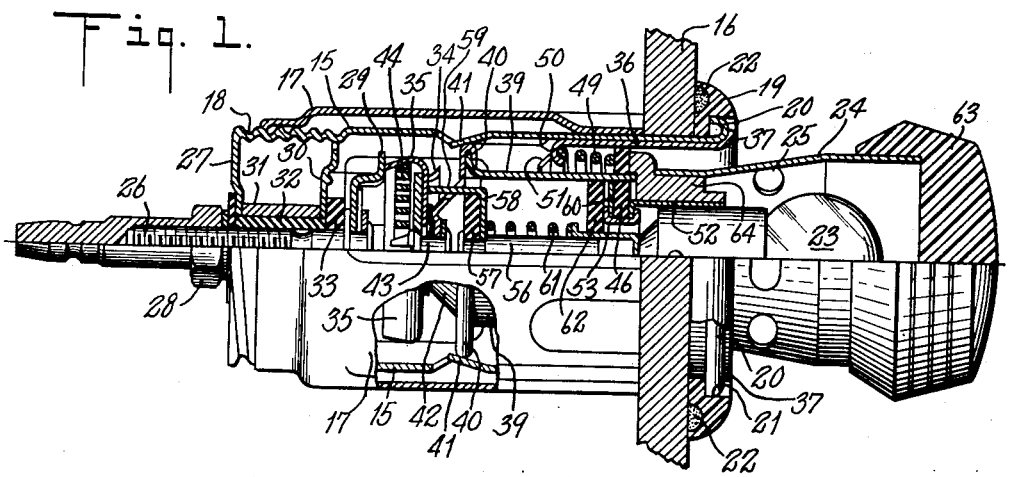
Fig. 1 is a longitudinal section and side elevation of a socket and plug embodying the invention of this application, the plug being in the position for activating the igniter and the indicator.
Figure 2:
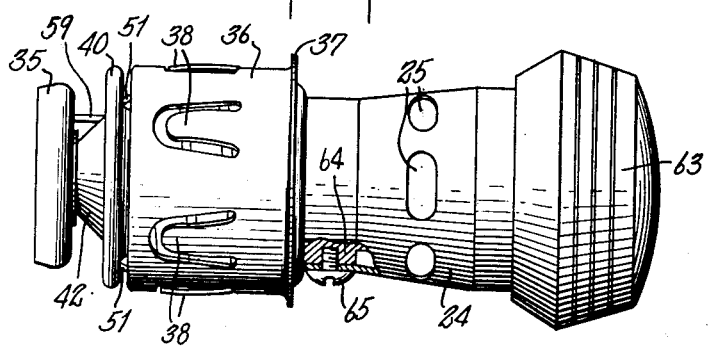
Fig. 2 is a side view of the igniter plug.
Figure 3:
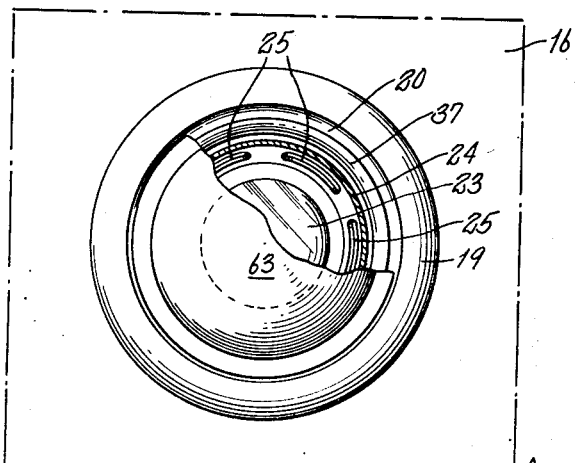
Fig. 3 is a fragmentary front view showing the indicator and the activating lamp bulb.

The socket 15 is mounted in a support 16 such

2 as an instrument board to which it is clamped by a tubular member 17 which screws onto the threaded end 18 of the socket.

The indicator is in the form of a ring 19 which is mounted on the end of the socket in front of the instrument board and held in place by the flange 20 at the mouth of the socket which extends into a recess 21 in the ring 19. In the back of the ring 19 is provided a layer of luminescent material 22 which is capable of being activated by the light from a bulb 23. This lamp bulb is mounted in a tubular housing 24 which has a series of openings 25 so located that the light from the lamp bulb shines through the indicator on to the luminescent material 22 when the plug is inserted for activation of the igniter.

Current is supplied to the igniter in a conventional manner. For this purpose the spindle 26 is mounted in the rear wall 27 of the socket and clamped in place by a nut 28. This spindle carries a contact member 29 at its inner end and is positioned in the socket by a metal disc 30 which is spaced apart from the rear wall by a tubular member 31 but insulated from the spindle by a sleeve 32 and the washer 33. The socket may be provided with automatic latches 34 such as are commonly employed in combination with stationary abutments 29. The plug carries at its inner end a contact cup 35 which, when the circuit is closed, engages either the latch fingers 34 or the abutment 29.

The plug has a ring or outer sleeve 36 which is slidably mounted in the socket and has a flange 37 which abuts against the end flange 20 of the socket when the plug is in place in the socket. To frictionally hold the plug in the socket a number of spring fingers 38 are usually employed.

The inner sleeve or shell 39 of the plug has a rim 40 which is adapted to contact the spring finger 41 of the socket when the plug is inserted for ignition.

The end wall 42 of the plug connects the sleeve 39 to the central stud 43 which is insulated from the cup 35. The igniter coil 44 connects the cup 35 with the stud 43. The inner sleeve 39 of the plug is guided in the ring or outer sleeve 36 by an insulating washer 46 which has slots 47 to receive the lugs 48 which are bent over to secure the sleeve 39 on the washer. A spring 49 surrounds the sleeve 39 between the washer 46 and the flange 50 of the ring so as to press the plug toward an inactive position in which position the lugs 51 on the ring press against the flange 41 of the sleeve 39. There would usually be three or four of these lugs 51 so as to leave as much air space as possible between the sleeve 39 and the ring 36.

The lamp bulb 23 is detachably supported in the lamp socket 52 which is secured by an eyelet 53 to the insulating guide washer 46. The center contact 55 for the lamp bulb is slidably mounted on the pin 56 which is supported by the washer 57 and thus positioned inside the sleeve 39 of the plug. A conductor 58 is mounted on this pin and has a projection 59 which extends through an opening 59' in the end wall 42 of the plug and is electrically connected to the igniter cup 35. Another conductor 60 in the form of a disc is mounted on the eyelet 53 and engages the end of the sleeve 39 when the parts are assembled. The spring 61 on the pin 56 is interposed between the conductor 58 and the end of the center contact 55. This center contact is positioned by an insulating washer 62 which is mounted in the sleeve 39.

It will thus be seen that the center contact of the lamp bulb is electrically connected to the igniter cup 35 and the outer socket contact of the lamp bulb is connected to the sleeve 39 so that when the plug is pushed into the position of Fig. 1 the igniter circuit from the spindle 26 may be traced through one of the stationary contacts on the inner end of the spindle to the cup 35 and thus through the coil 44 to the stud 43, end plate 42, rim 40, sleeve 39, finger 41 and socket 15 to the instrument board 16.

The lamp circuit may be similarly traced from the spindle 26 to one of the contacts 29 or 34 to the igniter cup 35 and thence through the conductor 58 to the pin 56, center contact 55 through the lamp filament to the socket 52, eyelet 53, conductor 60, sleeve 39, rim 40, finger 41 and socket 15 to the instrument board.

The knob 63 may be made of any suitable material and mounted on the outer end of the tapered housing 24. This housing is mounted on a bushing 64 which in turn is secured on the socket 52. The knob is detachably secured on the bushing 64 in any suitable manner as, for instance, by a set screw 65 which passes through a wall of the housing and screws into the bushing.

It will be understood that the indicator may take various forms and be formed of any suitable transparent material, preferably a molded plastic which is not readily frangible and may have part of its wall of curved section like a lens, and provided with any suitable phosphorescent material capable of being sufficiently activated by a light from the lamp bulb 23. This indicator is preferably located on the end of the socket of the lighter plug and provided with an annular layer of the phosphorescent substance so as to provide a maximum indication of the location of the mouth of the socket.

As the circuits of the lamp and the igniter are in parallel, the light from the lamp bulb serves as an indicator when current is passing through the igniter coil. When the light from the lamp bulb goes out it means that the igniter is no longer in the circuit although the indicator ring will continue to glow for a short time and indicate to the user the location of the entrance to the socket.

We claim:

1. An electric cigar lighter comprising the combination of a supporting socket and a removable igniter plug having a heater coil, a locator ring mounted on the end of the socket and provided with a photoluminescent substance, the igniter plug having a lamp bulb in circuit with the heater coil and mounted in position to excite the phosphorescent substance when the coil is being heated, said lamp being provided with means for shielding direct luminous emission therefrom from passing forwardly of the lighter and thereby striking the eye of the operator thereof, and being also provided with apertured means for directing the luminous flux upon said photoluminescent substance.

2. The combination of a socket having circuit terminals and a removable igniter plug having a knob at one end and having a coil with terminal contacts adapted to be brought into connection with said socket terminals on said socket, a photoluminescent locator adjacent the mouth of the socket and an electric lamp carried by the knob of the plug and connected in parallel with the igniter coil, said lamp being in position to activate the photoluminescent locator, said lamp being provided with means for shielding direct luminous emission therefrom from passing forwardly of the lighter and thereby striking the eye of the operator thereof, and being also provided with apertured means for directing the luminous flux upon said photoluminescent substance.

3. The combination of a socket having circuit terminals and a removable igniter plug having a coil with terminal contacts, means for bringing said contacts into connection with said socket terminals on said socket, a photoluminescent locator ring surrounding the mouth of the socket and an electric lamp carried by the plug and connected in parallel with the igniter coil, said lamp being in position to activate the photoluminescent locator, said lamp being provided with means for shielding direct luminous emission therefrom from passing forwardly of the lighter and thereby striking the eye of the operator thereof, and being also provided with apertured means for directing the luminous flux upon said photoluminescent substance.

4. A plug for an electric cigar lighter having an annular supporting member, means for mounting said member in a socket, a locator ring surrounding the mouth of said socket and bearing a photoluminescent material, a body member having an insulating washer slidably supported at one end in said supporting member and having an external contact rim near its opposite end, an igniter unit having a coil with one end connected electrically to said body, a central conducting pin having one end connected electrically to the other end of the igniter coil, an insulating washer at each end of said pin supporting said pin in said body, a bushing connected to said body, a lamp socket within said bushing, a center lamp contact slidable on said pin and a knob having a housing supported on said bushing for a lamp bulb held in said lamp socket, said housing having an opening for light to shine from said housing entirely in such direction that the direct luminous flux will impinge upon said photoluminescent material and will be shielded from impingement upon the operator's eye.

5. A plug for an electric cigar lighter having an annular supporting member, means for mounting said member in a socket, a locator ring surrounding the mouth of said socket and bearing a photoluminescent material, a body member slidably supported at one end on said supporting member and having an external contact rim at its opposite end, an igniter unit having a coil connected electrically to said body, a central conducting member having one end connected electrically to the igniter coil, insulating washers supporting said member in said body, a bushing connected to said body, a lamp socket connected to said bushing, a center lamp contact on said member and a knob having a housing supported on said bushing for a lamp bulb held in said lamp socket, said housing having means to permit light to shine from said housing directly upon said photoluminescent material, and other means for shielding light from reaching the operator's eye.

6. A cigar lighter plug for insertion into a terminal socket comprising an outer metallic sleeve for supporting the plug in a socket, an inner metallic sleeve slidable in said outer sleeve, a hollow knob secured to one end of the inner sleeve, a contact rim carried by the opposite end of the inner sleeve for engaging a part of the socket into which the outer sleeve fits, an igniter cup containing an igniter coil, the outer end of the coil being connected to the cup, a center stud connected to the end of the inner sleeve and to the inner end of said coil, a lamp socket supported in the knob and connected to said inner sleeve, a center lamp contact within the lamp socket and conducting means between the center lamp contact and said cup consisting of a pin arranged concentrically of the lamp socket, an insulating washer on each end of said pin supported in the inner sleeve, a conductor connecting said cup and said pin and a lamp carried by said lamp socket, said hollow knob constituting both a handle for manual manipulation of said plug and a lamp shield having a passage for the emission of light from said bulb toward said socket.

7. A cigar lighter plug for insertion into a terminal socket comprising an outer metallic sleeve for supporting the plug in a socket, an inner metallic sleeve slidable in said outer sleeve, a spring compressed between the ends of said inner and outer sleeves, a hollow knob secured to one end of the inner sleeve, a contact rim carried by the opposite end of the inner sleeve for engaging a part of the socket into which the outer sleeve fits, an igniter cup containing an igniter coil, the outer end of the coil being connected to the igniter cup, a center stud electrically and mechanically connected to the end of the inner sleeve and to the inner end of said coil, a lamp socket supported in the knob and connected electrically to said inner sleeve, a center lamp contact within the lamp socket and conducting means between the center lamp contact and said cup comprising a pin at the socketed end of the sleeve, insulating washers supported in the inner sleeve and adjacent the ends of said pin to provide support thereto, a spring pressed contact member slidable on an end of said pin and a conductor connecting said pin to said cup, a lamp carried by said socket and having a terminal in contact with said spring pressed contact member, said hollow knob constituting both a handle for manual manipulation of said plug and a lamp shield having a passage for the emission of light from said bulb toward said socket while shielding said lamp to prevent direct luminous emission therefrom from passing forwardly of the lighter and thereby striking the eye of the operator.

ALFRED J. KROLL.
ARTHUR W. SCHNICK.

References Cited in the file of this patent

UNITED STATES PATENTS

| Number | Name | Date |
| --- | --- | --- |
| 776,211 | Abbey | Nov. 29, 1904 |
| 2,015,101 | Dieckmann | Sept. 24, 1935 |
| 2,037,882 | Cohen | Apr. 21, 1936 |
| 2,144,376 | Johnson | Jan. 17, 1939 |
| 2,188,264 | Fordyce | Jan. 23, 1940 |
| 2,220,607 | Mayo | Nov. 5, 1940 |
| 2,251,611 | Johnson | Aug. 5, 1941 |
| 2,260,588 | Smith | Oct. 28, 1941 |
| 2,270,564 | Schroeder | Jan. 20, 1942 |
| 2,356,267 | Pelunis | Aug. 22, 1944 |
| 2,419,950 | Johnson | May 6, 1947 |
| 2,475,534 | Wales | July 5, 1949 |
| 2,514,171 | Waltner, Jr. | July 4, 1950 |
| 2,531,901 | Ashton | Nov. 28, 1950 |

FOREIGN PATENTS

| Number | Country | Date |
| --- | --- | --- |
| 475,398 | Great Britain | Nov. 18, 1937 |